UNITED STATES PATENT OFFICE.

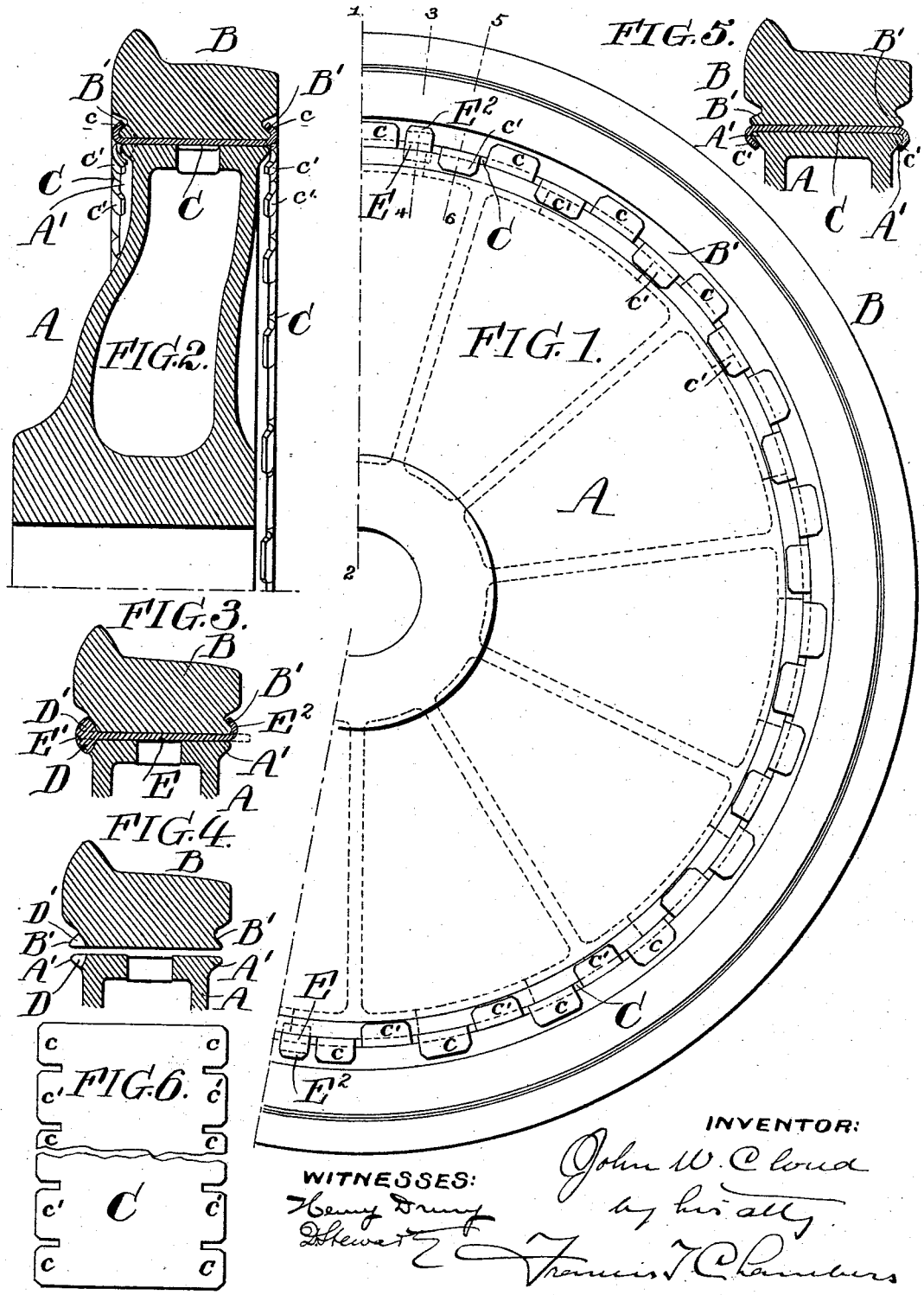

JOHN WILLS CLOUD, OF CHICAGO, ILLINOIS.

CAR-WHEEL.

SPECIFICATION forming part of Letters Patent No. 492,529, dated February 28, 1893.

Application filed December 6, 1892. Serial No. 454,211. (No model.)

*To all whom it may concern:*

Be it known that I, JOHN WILLS CLOUD, of Chicago, county of Cook, State of Illinois, have invented a certain new and useful Improvement in Locomotive and Car Wheels, of which the following is a true and exact description, reference being had to the accompanying drawings, which form a part of this specification.

My invention relates to wheels in which a steel tire is secured in place, upon the periphery of a wheel center, generally of iron, and particularly to wheels of this kind made in accordance with my patent reissue, No. 10,869, dated October 4, 1887, or to wheels of a generally similar character.

The object of my invention is, to provide means for preventing the tire from slipping, or rather, turning upon the wheel center, if for any reason it becomes so loose that such a motion could occur; and I prevent this danger by the use of a key or keys combined with the parts making up the wheel, in the way hereinafter described. Reference being now had to the drawings which illustrate my invention, and in which,—

Figure 1, is a side view of a portion of a locomotive wheel embodying my improvement. Fig. 2, a section on the line 1—2 of Fig. 1. Fig. 3, a section on the line 3—4 of Fig. 1, showing the key in position. Fig. 4, a section on the same line with the key withdrawn. Fig. 5, a section on the line 5—6 of Fig. 1, and Fig. 6, a plan view of a portion of the intervening strip.

A, indicates the wheel center, the periphery of which is preferably provided with laterally extending annular projections A'.

B, is the tire, which is provided at its inner periphery with similar projections, B' B'. These projections in the case shown, being really formed by recessing the metal as the tire is broader than the main body of the wheel center.

C, is a strip or strips of wrought iron made broader than the face of the tire or wheel center and secured between them, as described in my former patent: that is, its projecting edges are slit so as to form a series of tags $c$ $c'$, which are bent up and down alternately, and over against the projections B' and C' with the effect of locking the center and tire together, so that in case the tire breaks its fragments will not fly away from the center.

E, indicates the key, which, in accordance with my present invention, I use to prevent the tire from turning on the wheel center, its shank is inserted between the center and tire taking the place of the strip C which terminates on each side of the space occupied by the key. In the construction shown, two of these keys are employed at opposite sides of the wheels and accordingly there would be at least two strips C, each running nearly round one half of the wheel. The shank or body of the key is provided with a head E', extending up and down as shown and fitting into recesses D and D', formed in the edges of the tire and wheel rim to receive it, such recesses being of course made to register with each other; they can be formed in any convenient way although I have found the use of a milling tool to be the most convenient way of forming the recesses. The engagement of the head E' with these registering recesses in the tire and center prevents any turning motion of the tire on the center.

While various ways of fastening the key in place may be employed, I have found it best to continue the shank or body of the key between the center and tire until it projects on the opposite side to that against which the head abuts, and I then bend the projecting end indicated by $E^2$ over against one of the projections, for instance, as shown in Fig. 3, against the projection B'.

Having now described my invention, what I claim as new, and desire to secure by Letters Patent, is—

1. In combination with a wheel center a tire and an intervening strip, a key E having a head E' adapted to fit in registering recesses formed in the edges of the wheel center and tire.

2. In combination with a wheel center a tire and an intervening strip, a key E having a head E' adapted to fit in registering recesses formed in the edges of the wheel center and tire and an end $E^2$ adapted to extend through to the opposite side of the wheel and by which the key is secured in place.

3. The combination with a wheel center, a tire and intervening strips C adapted to secure the center and tire together as described, keys E, passing between the center and tire and between the ends of strips C, said keys having heads E' adapted to fit in registering recesses formed in the edges of the center and rim.

4. The combination with a wheel center, a tire and intervening strips C adapted to secure the center and tire together as described, keys E passing between the center and tire and between the ends of strips C, said keys having heads E' adapted to fit in registering recesses formed in the edges of the center and tire, and having their opposite ends bent over to lock the key in place.

JOHN WILLS CLOUD.

Witnesses:
   JOSEPH W. TAYLOR,
   C. D. EWER.